US008023385B2

(12) United States Patent
Jung

(10) Patent No.: US 8,023,385 B2
(45) Date of Patent: Sep. 20, 2011

(54) METHOD OF RECORDING HOLOGRAPHIC INFORMATION AND APPARATUS FOR RECORDING/REPRODUCING HOLOGRAPHIC INFORMATION

(75) Inventor: Moon-Il Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 191 days.

(21) Appl. No.: 12/553,253

(22) Filed: Sep. 3, 2009

(65) Prior Publication Data

US 2010/0142352 A1    Jun. 10, 2010

(30) Foreign Application Priority Data

Dec. 8, 2008 (KR) .................. 10-2008-0124296

(51) Int. Cl.
*G11B 7/00* (2006.01)
(52) U.S. Cl. ..................................... 369/103
(58) Field of Classification Search ................ None
See application file for complete search history.

(56) References Cited

U.S. PATENT DOCUMENTS

| 6,512,606 | B1 | 1/2003 | Lipson et al. | |
| 7,742,380 | B2 * | 6/2010 | Usami | 369/103 |
| 7,916,610 | B2 * | 3/2011 | Tanabe | 369/103 |
| 2004/0009406 | A1 | 1/2004 | Hesselink et al. | |
| 2004/0165518 | A1 | 8/2004 | Horimai et al. | |
| 2006/0275670 | A1 | 12/2006 | Riley et al. | |
| 2007/0081439 | A1 | 4/2007 | Tsukagoshi et al. | |
| 2009/0059759 | A1 * | 3/2009 | Yoshizawa et al. | 369/94 |

FOREIGN PATENT DOCUMENTS

EP    1 930 886    6/2008

OTHER PUBLICATIONS

European Search Report issued on Feb. 17, 2010, in corresponding European Patent Application No. 09172986.3 (6 pages).

* cited by examiner

*Primary Examiner* — Joseph Haley
(74) *Attorney, Agent, or Firm* — NSIP Law

(57) ABSTRACT

A method of recording holographic information and an apparatus for recording/reproducing holographic information. The method includes: forming an information layer by recording a hologram on a holographic recording layer of a holographic information storage medium; and fixing the information layer on which the hologram is recorded, by radiating light on the information layer.

19 Claims, 9 Drawing Sheets

METHOD OF RECORDING HOLOGRAPHIC INFORMATION AND APPARATUS FOR RECORDING/REPRODUCING HOLOGRAPHIC INFORMATION

CROSS-REFERENCE TO RELATED APPLICATION

This application claims the benefit of Korean Patent Application No. 10-2008-0124296, filed on Dec. 8, 2008, in the Korean Intellectual Property Office, the disclosure of which is incorporated herein, by reference.

BACKGROUND

1. Field

The present teachings relate to a method of recording holographic information, whereby stability of a reproduction signal is secured.

2. Description of the Related Art

Recently, holographic information storing technology has attracted much attention. A holographic data storage unit stores information in a photosensitive material, such as a photopolymer, in the form of an optical interference pattern. The optical interference pattern is formed by using two coherent laser beams, that is, a reference beam and a signal beam, which have different paths and interfere with each other. The optical interference pattern generates chemical or physical change in a photosensitive information storage medium, and thus, is recorded in the photosensitive information storage medium. In order to reproduce information from the interference pattern, the reference beam is radiated on the interference pattern recorded in the photosensitive information storage medium. Accordingly, a diffraction pattern is generated due to the interference pattern, thereby restoring the signal light, and thus, the information is reproduced.

Such information storage technology may be categorized into a volume holography method, whereby recording/reproducing is performed page by page, and a micro holography method, whereby recording/reproducing is performed bit by bit, using individual interference fringes. According to the volume holography method, a massive amount of information is simultaneously processed, but since a very precisely adjusted optical system is generally needed, it is difficult to commercialize volume holography for general consumers.

Meanwhile, according to the micro holography method, information is recorded 3-dimensionally in the information storage medium, by forming minute interference fringes, which are formed by the interference of two concentrated beams, at a focal point. A recording layer generally includes a plurality of such minute interference fringes, and is disposed in plane of the information storage medium. Multiple recording layers are formed at different depths, in the information storage medium.

Generally, according to the micro holographic method, the recording capacity is increased, by forming a plurality of the recording layers. However, noise may be generated while reproducing the information, if pattern stability is not secured in an area on which the interference patterns are recorded.

SUMMARY

The present teachings provide a method of recording holographic information, and an apparatus for recording/reproducing holographic information, wherein the stability of a reproduction signal is secured.

A method of recording holographic information, according to an exemplary embodiment, includes: forming an information layer by recording one or more holograms on a holographic recording layer of a holographic information storage medium; and fixing the information layer, by radiating light onto the information layer.

A plurality of information layers may be formed at different depths in the holographic recording layer. Each information layer is formed and fixed, before a subsequent information layer is formed and fixed.

When an information layer is fixed, an area of the recording layer, between the information layer and a subsequent information layer, may also be fixed, prior to forming the subsequent information layer. In other words, the fixing may include fixing an area of the recording layer where no hologram is recorded, i.e., an area between the information layer and a subsequent information layer.

According to some embodiments, the plurality of information layers may be sequentially formed and fixed, and areas between each of the plurality of information layers may be fixed thereafter.

According to some embodiments, each of the information layers may include a recording area on which the hologram is recorded, and a spacer area. The fixing beam may be radiated on both the recording area and the spacer area.

According to some embodiments, a light source used for the fixing may also be used in the recording.

According to various embodiments, the holographic information storage medium may include a reflective layer and a holographic recording layer. A signal beam and a reference beam obtained from a light source may be radiated onto the holographic information storage medium, via the same side of the storage medium, to form holograms that make up information layers. One of the signal beam and the reference beam may be directly focused on a focal point in the holographic recording layer, and the other one of the signal beam and the reference beam may be focused on the focal point, after being reflected from the reflective layer. A first one of the information layers may be formed at a location of the holographic recording layer that is farthest from, or nearest to, the reflective layer. The information layers may be fixed using the light emitted from the light source that is focused on the information layers, without being reflected from the reflective layer.

According to various embodiments, the information layers may be formed by radiating the signal beam and the reference beam through opposite sides of the holographic information storage medium. The information layers are sequentially formed, starting at one side of a holographic recording layer. The information layers may be fixed using a fixing light that is focused on the information layers, without first passing through an unrecorded portion of the holographic recording layer.

According to various embodiments, both a signal beam and a reference beam can be divided from light emitted from a single light source. The undivided light from the light source can be used to fix the information layers. The information layers can be formed at different depths in the holographic recording layer, by changing the depth of a focal point at which the signal and reference beam are focused.

According to various embodiments, provided is an apparatus for recording and reproducing holographic information. The apparatus includes an optical pickup that records a hologram (information layer) on a holographic recording layer, by radiating a light beam on a holographic information storage medium comprising the holographic recording layer. The optical pickup fixes the recorded hologram, by radiating a light beam on the hologram, wherein the holographic information is recorded by using the method above.

Additional aspects and/or advantages of the present teachings will be set forth in part in the description which follows and, in part, will be obvious from the description, or may be learned by practice of the present teachings.

BRIEF DESCRIPTION OF THE DRAWINGS

These and/or other aspects and advantages of the present teachings will become apparent and more readily appreciated from the following description of the embodiments, taken in conjunction with the accompanying drawings of which.

DETAILED DESCRIPTION OF THE EXEMPLARY EMBODIMENTS

Figure 1:
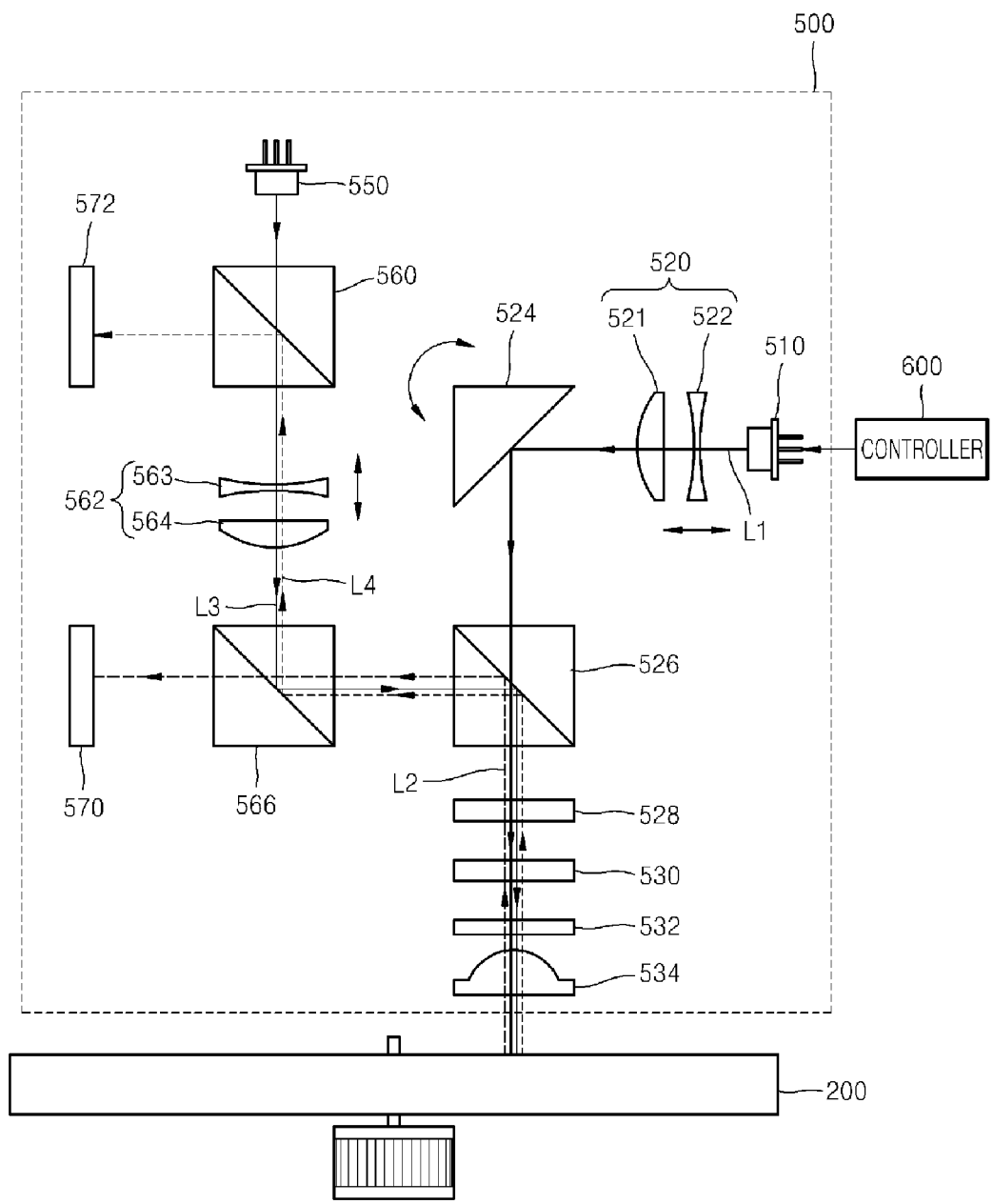
FIG. 1 is a diagram schematically illustrating an apparatus for recording/reproducing holographic information, the apparatus performing a method of recording holographic information, according to an exemplary embodiment of the present teachings.

Reference will now be made in detail to the exemplary embodiments of the present teachings, which are illustrated in the accompanying drawings, wherein like reference numerals refer to the like elements throughout. The exemplary embodiments are described below, in order to explain the aspects of the present teachings, by referring to the figures.

According to an exemplary embodiment, an information layer is formed by recording a hologram (interference fringe pattern) on a holographic recording layer of a holographic information storage medium. Then the information layer is fixed by radiating light thereon. As such, by fixing the information layer, stability of the fringe pattern is secured, and thus, noise generated during reproduction is decreased. Also, when forming a subsequent information layer, recording precision is increased, by decreasing a thickness of the subsequent information layer, and by suppressing a spherical aberration that is generated as light reaches the subsequent information layer. In addition, stability during reproduction is obtained.

According to various embodiments that will be described below, an information layer is fixed before forming another information layer is formed, and thus, a light beam for recording/reproduction can also be used to fix the information layer. Accordingly, a separate light source for fixing the information layer may not be needed.

Figure 2:
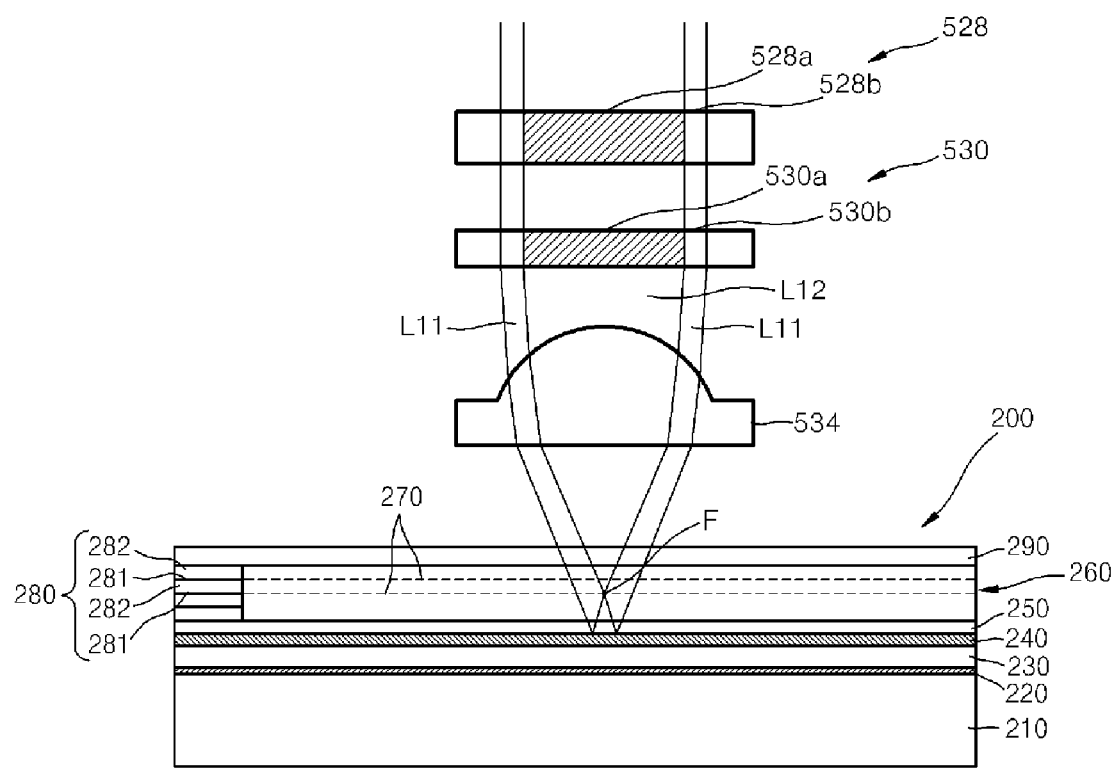
FIG. 2 is a diagram schematically illustrating a reflective holographic information storage medium that may be employed by the apparatus of FIG. 1.

FIG. 1 is a diagram schematically illustrating a recording/reproducing apparatus for holographic information. FIG. 2 is a diagram schematically illustrating a reflective holographic information storage medium 200 that may be employed by the apparatus of FIG. 1.

Referring to FIG. 1, the apparatus records information in the reflective holographic information storage medium 200, and reproduces the recorded information. The apparatus includes: an optical pickup 500 that radiates light on planes of the reflective holographic information storage medium 200; a controller 600 that controls the optical pickup 500; and a circuit unit (not shown). The controller 600 controls the optical pickup 500, so that an information layer is formed by recording a hologram on the reflective holographic information storage medium 200, via light radiated from the optical pickup 500, and the information layer is fixed by radiating light.

The optical pickup 500 may form information layers in different planes of a holographic recording layer of the reflective holographic information storage medium 200. The optical pickup 500 may fix the information layer by radiating light thereon.

The optical pickup 500 may include a first light source 510, a first focus control unit 520, a reflective member 524, a first beam splitter 526, a polarization conversion unit 528, a polarization selective refractive lens 530, a quarter wave plate 532, an object lens 534, and a first optical detector 570. The first light source 510 emits light L1 used for record/reproduction and/or fixation, and may be a semiconductor laser diode that emits green light or blue light.

The first focus control unit 520 changes the location of a focal point of the light L1, in the reflective holographic information storage medium 200. The first focus control unit 520 may include a plurality of relay lenses. For example, the first focus control unit 520 may include relay lenses 521 and 522. At least one of the relay lenses 521 and 522 may move along an optical axis, by being operated by a driver (not shown). By moving at least one of the relay lenses 521 and 522 along the optical axis, the first focus control unit 520 may change the focal point of the light L1 in the reflective holographic information storage medium 200. A plurality of information layers may be recorded in the reflective holographic information storage medium 200, by using the first focus control unit 520. In other words, as illustrated in FIG. 2, a signal beam L11 and a reference beam L12 obtained from the light L1 are concentrated on a focal point (F) in the reflective holographic information storage medium 200, and thus, an information layer is formed as a hologram, since the signal beam L11 and the reference beam L12 interfere with each other. Also, when the first focus control unit 520 changes a focal point of the light L1, another information layer can be recorded at a different depth. Accordingly, a plurality of information layers may be formed in the holographic recording layer 260.

In the current exemplary embodiment, a beam expander including the relay lenses 521 and 522 is used as the first focus control unit 520, but the constitution of the first focus control unit 520 is not limited thereto. For example, the first focus control unit 520 may be a liquid crystal lens. A refraction angle of light having predetermined polarization changes, according to the size of a voltage applied to the liquid crystal lens. Accordingly, a focal point of the light may be changed. Since liquid crystal lenses are well known to one of ordinary skill in the art, details thereof are not provided herein.

As shown in FIG. 2, a focal length of the signal beam L11 is longer than that of the reference beam L12. The signal beam L11 and the reference beam L12 are transmitted to the reflective holographic information storage medium 200, via the same optical path. The different focal lengths of the signal beam L11 and the reference beam L12 may be obtained via the polarization selective refractive lens 530.

The reflective member 524 is a mirror that suitably adjusts an optical path, and enables optical devices in the optical pickup 500 to be suitably disposed. The reflective member 524 moves a reflective plane 2 dimensionally, according to the tilting of the reflective holographic information storage medium 200. Thus, the optical pickup 500 corresponds to the tilting of the reflective holographic information storage medium 200.

The first beam splitter 526 may operate as a polarization beam splitter to divide the light L1 emitted from the first light source 510. The first beam splitter 526 may operate as a simple reflective mirror for a servo beam L3 of a second light source 550 that will be described later. A polarization direction of the light L1 radiated on the reflective holographic information storage medium 200 is at a right angle to a polarization direction of the light L1 reflected from the reflective holographic information storage medium 200, which will be described later. Accordingly, when the first beam splitter 526 operates as a polarization beam splitter for the light L1, the first beam splitter 526 may separate the light L1 transmitted to the reflective holographic information storage medium 200, and light L2 reflected from the reflective holographic information storage medium 200.

The polarization conversion unit 528 may vary a polarization conversion, according to an area to which light is transmitted. For example, referring to FIG. 2, the polarization conversion unit 528 may be structured to include a non-conversion area 528a, through which p-polarized light emitted from the first light source 510 is transmitted without any polarization conversion, during a recording mode or a reproduction mode, and a selective polarization conversion area 528b, which converts p-polarized light emitted from the first light source 510, into s-polarized light, during a recording mode. The polarization conversion unit 528 transmits the p-polarized light emitted from the first light source 510, without any polarization conversion, during a reproduction or fixing mode. Here, the non-conversion area 528a may be in a central area of the polarization conversion unit 528, and the selective polarization conversion area 528b may be in a boundary area surrounding the central area of the polarization conversion unit 528. Alternatively, the selective polarization conversion area 528b may be in the central area of the polarization conversion unit 528, and the non-conversion area 528a may be in the boundary area of the polarization conversion unit 528.

In the polarization conversion unit 528, the non-conversion area 528a may be formed of a transparent material, and the selective polarization conversion area 528b may be an active ½ wave plate. The active ½ wave plate may change the p-polarized light to s-polarized light, during the recording mode, by disposing an optical axis at a 45° angle, with respect to a polarization direction of the p-polarized light. Meanwhile, since the non-conversion area 528a transmits the p-polarized light, regardless of the recording mode, the p-polarized light transmitted through the non-conversion area 528a may correspond to the reference beam L12, and the s-polarized light from the selective polarization conversion area 528b may correspond to the signal beam L11.

Accordingly, during the recording mode, the signal beam L11 and the reference beam L12 cross each other and pass through the polarization selective refractive lens 530, along the same optical path, after being divided into external (outer) light flux and internal (inner) light flux. During the reproducing or fixing mode, the light L1 is not divided into internal light flux and external light flux and proceeds in a single polarization state.

The polarization selective refractive lens 530 differentiates the refractive power of light that is transmitted through the polarization conversion unit 528, according to a polarization direction. For example, the polarization selective refractive lens 530 may transmit p-polarized light and refract s-polarized light. A liquid crystal lens or polarization hologram device, which differentiates the refractive power according to a polarization direction, may be used as the polarization selective refractive lens 530. The liquid crystal lens uses a double refraction characteristic of a liquid crystal. When a voltage is applied to the liquid crystal, an alignment state of liquid crystal molecules changes, and thus, the liquid crystal has different refractive powers for p-polarization and s-polarization light components. The polarization hologram device has different refractive powers, according to a polarization direction of received light, has a stepped or blazed hologram pattern, and may refract light having a first polarization component and transmit light having a second polarization component. Since the liquid crystal lens and the polarization hologram device are well known to one of ordinary skill in the art, details thereof are not provided herein.

For example, referring to FIG. 2, during the recording mode, the p-polarized reference beam L12 is radiated to a first refractive lens area 530a of the polarization selective refractive lens 530. The first refractive lens area 530a corresponds to the non-conversion area 528a of the polarization conversion unit 528, and thus, the reference beam L12 incident on the first refractive lens area 530a is transmitted there through, without refraction. The s-polarized signal beam L11 is radiated to a second refractive lens area 530b of the polarization selective refractive lens 530. The second refractive lens area 530b corresponds to the selective polarization conversion area 528b of the polarization selective refractive lens 530, and thus, the signal beam L11 incident on the second refractive lens area 530b is refracted. In FIG. 2, the first refractive lens area 530a and the second refractive lens area 530b are indicated to classify areas corresponding to the non-conversion area 528a and the selective polarization conversion area 528b, and are not classified with respect to an optical structure.

While the signal beam L11 and the reference beam L12 are transmitted through the polarization selective refractive lens 530, focal lengths of the signal beam L11 and the reference beam L12, obtained by the object lens 534, differ from each other. In FIG. 2, the focal length of the signal beam L11, which is external light flux, is greater than the focal length of the reference beam L12, which is internal light flux. However, the polarization selective refractive lens 530 may be formed such that the focal length of the reference beam L12 is greater than the focal length of the signal beam L11. Alternatively, the internal light flux having a nearer focus may be used as the signal beam L11, and the external light flux having a farther focus may be used as the reference beam L12.

During the reproducing or fixing mode, the light L1 emitted from the first light source 510 proceeds in a single polarization state, without being divided into internal light flux and external light flux, by the polarization conversion unit 528. Thus, like the reference beam L12, during the recording mode the light L1 is transmitted through the polarization selective refractive lens 520, without refraction, and is transmitted along the same optical path as the reference beam L12. In other words, during the reproducing or fixing mode, the light L1 is focused on a focal point of the object lens 534, without any reflection process.

Referring back to FIG. 1, the quarter wave plate 532 exchanges the polarization of the light L1 incident on the reflective holographic information storage medium 200, and the polarization of the light L2 reflected from the reflective holographic information storage medium 200. For example, the quarter wave plate 532 may convert rotational polarized light into circular polarized light, and may convert circular polarized light, which is reflected from the reflective holographic information storage medium 200, into rotational polarized light that crosses the rotational polarized received light. Accordingly, a path of the light L2 reflected from the reflective holographic information storage medium 200 may be separated from a path of the light L1 incident on the reflective holographic information storage medium 200, and detected by the first optical detector 570.

During the recording mode, the signal beam L11 and the reference beam L12 are incident on the reflective holographic information storage medium 200, in circular polarization directions that cross each other, via the quarter wave plate 532. During the reproducing or fixing mode, the selective polarization conversion area 528b transmits incident light, without polarizing the incident light. Accordingly, the p-polarized light L1 emitted from the first light source 510 is transmitted through the polarization conversion unit 528, without being polarized, and is transmitted through the polarization selective refractive lens 530, without any refraction angle change. Thus, the p-polarized light L1 is converted to a circular polarization state, by the quarter wave plate 532, is radiated to the reflective holographic information storage medium 200, and is directly focused on the focal point F, along the path of the reference beam L12, during the recording mode. As such, the p-polarized light L1, during the reproducing or fixing mode, has the same polarization characteristic and focal length as the reference beam L12, during the recording mode. Accordingly, the reference beam L12 can be used during the reproducing or fixing mode.

The object lens 534 concentrates the light L1 and the servo beam L3, during the recording, reproducing, or fixing mode, on a predetermined area of the reflective holographic information storage medium 200. As described above, the signal beam L11 and the reference beam L12 have different circular polarization directions that cross each other, and the polarization selective refractive lens 530 differentiates a refractive power, according to a polarization direction. Accordingly, focal lengths of the signal beam L11 and the reference beam L12, from the object lens 534, may differ. Here, the object lens 534 or the refractive power of the polarization selective refractive lens 530 may be designed in such a way that, by adjusting the focal length of the reference beam L12 to be shorter than the focal length of the signal beam L11, the reference beam L12 may be directly concentrated on the focal point F, on an information layer 270, and the signal beam L11 may be reflected from a reflective layer 240 and then concentrated on the focal point F. The object lens 534 or the refractive power of the polarization selective refractive lens 530 may differ, according to the relative locations of optical devices, and the characteristics of the reflective holographic information storage medium 200.

The optical pickup 500 may include the second light source 550, a second focus control unit 562, a second beam splitter 560, a third beam splitter 566, and a second optical detector 572, so as to obtain a servo signal.

The second light source 550 emits the servo beam L3, and may be a semiconductor laser diode that emits red light. The servo beam L3 may be rotationally polarized in one direction, so that the servo beam L3 transmitted from the second beam splitter 560 to the reflective holographic information storage medium 200, and a servo beam L4 reflected from the reflective holographic information storage medium 200, are separated according to a polarization direction, as will be described later. A diffraction grid (not shown) may be further included in front of the second light source 550, so as to diffract the servo beam L3 into 0 degree diffracted light, ±1 degree diffracted light, etc. Accordingly, a 3-beam method or a differential push-pull method may be used to detect a servo error signal. In FIG. 1, in order to read servo information, the light L1 and the servo beam L3, which have different wavelengths, are emitted from different light sources. However, instead of preparing a separate servo optical system, the first light source 510 may be configured to also emit the servo beam L3.

A polarization beam splitter may be used as the second beam splitter 560. A polarization direction of the servo beam L3 incident on the reflective holographic information storage medium 200, and a polarization direction of the servo beam L4 reflected from the reflective holographic information storage medium 200, cross each other at right angles, due to the quarter wave plate 532. Accordingly, by using a polarization beam splitter as the second beam splitter 560, the optical paths of the servo beam L3 incident on the reflective holographic information storage medium 200 and the servo beam L4 reflected from the reflective holographic information storage medium 200 are separated from each other.

A beam expander including relay lenses 563 and 564 may be used as the second focus control unit 562. Alternatively, a liquid crystal lens may be used as the second focus control unit 562. The second focus control unit 562 adjusts a focal point of the servo beam L3, on the reflective holographic information storage medium 200. A structure of the second focus control unit 562 is similar to the structure of the first focus control unit 520, and thus, a description thereof is not repeated.

The third beam splitter 566 may transmit the light L2 that is reflected from the reflective holographic information storage medium 200, and may operate as a simple mirror for the servo beams L3 and L4. Accordingly, the third beam splitter 566 may include a reflective layer that is designed to transmit or reflect light, according to wavelength.

The first optical detector 570 detects the light L2, after the light L2 is transmitted through the first and third beam splitters 526 and 566. The second optical detector 572 detects the servo beam L4, which is emitted from the second light source 550, reflected from the reflective holographic information storage medium 200, and transmitted through the first through third beam splitters 526, 560, and 566.

FIG. 2 illustrates an example of the reflective holographic information storage medium 200, according to an exemplary embodiment of the present teachings. However, the reflective holographic information storage medium 200 is not limited to the structure illustrated in FIG. 2. In other words, while in FIG. 2 the reflective holographic information storage medium 200 includes the reflective layer 240, the holographic recording layer 260, and a substrate 210, the reflective holographic information storage medium 200 may selectively include other and/or additional elements.

Referring to FIG. 2, the reflective holographic information storage medium 200 includes the substrate 210, a servo layer 220, a buffer layer 230, the reflective layer 240, a spacer layer 250, the holographic recording layer 260, and a cover layer 290, which are sequentially stacked in order stated above. The substrate 210 is a support prepared to maintain the shape of the reflective holographic information storage medium 200, and may be formed of a polycarbonate resin or an acrylic resin.

The cover layer 290 protects the holographic recording layer 260, and may also maintain the shape of the reflective holographic information storage medium 200, if the holographic recording layer 260 is not formed of a solid material, for example. An anti-reflection layer (not shown), which suppresses surface reflections, may be further disposed on a top surface of the cover layer 290. The signal beam L11 and the reference beam L12 record information by being transmitted to the holographic recording layer 260, via the cover layer 290.

The spacer layer 250 secures a space between the holographic recording layer 260 and the reflective layer 240, and secures a distance between the reflective layer 240 and the information layer 270. The thickness of the spacer layer 250 differs, according to performance of the holographic recording layer 260, and may be less than about 100 μm. By separating the reflective layer 240 and the information layer 270, noise generated by light reflected from the reflective layer 240 may be reduced, during reproduction. A relationship between the spacer layer 250 and the noise reduction will be described later. The spacer layer 250 is not essential, for example, an unrecorded portion in the thickness direction of the holographic recording layer 260 may be substituted for the spacer layer 250.

Regarding first and second circular polarization directions that cross each other, the reflective layer 240 may be formed of a polarization selective material that reflects light in the first circular polarization direction and transmits light in the second circular polarization direction. Also, the reflective layer 240 may be formed to maintain a polarization direction of the reflected light in the first circular polarization direction. The reflective layer 240 may be formed of a cholesteric liquid crystal formed of a liquefied or hardened liquid crystal film. A liquid crystal director of the cholesteric liquid crystal is twisted in a spiral shape. The cholesteric liquid crystal reflects circular polarized light corresponding to the spiral shape, and transmits circular polarized light corresponding to an opposite direction of the spiral shape, thereby separating the two perpendicular circular polarized beams and maintaining reflected light in an original circular polarization state. Here, a material of the reflective layer 240 is not limited to such a polarization selective material, and may be a general material for forming a reflective layer. In this case, a direction of the circular polarization of the reflected light may be converted into an opposite direction, and the first and second circular polarized beams may be transmitted through the cover layer 290, in the same polarization state.

As illustrated in FIG. 2, when the signal beam L11 is focused on the focal point F, after being reflected from the reflective layer 240. The polarization conversion unit 528 and the quarter wave plate 532 may be prepared in such a way that the signal beam L11 is the first circular polarized light and the reference beam L12 is the second circular polarized light.

The spacer layer 250 is disposed between the reflective layer 240 and the servo layer 220, and may be formed of a transparent material, or a material that absorbs light for record/reproduction. The spacer layer 250 covers patterns of servo information formed on the servo layer 200, so as to planarize the reflective layer 240.

The servo information is recorded on the servo layer 220, and the servo layer 220 reflects the servo beam L3. Since a wavelength of the servo beam L3 is different from a wavelength of the light L1, the buffer layer 230, the reflective layer 240, the spacer layer 250, the holographic recording layer 260, and the cover layer 290 are prepared to transmit the servo beam L3.

When the apparatus records holographic information, the information layer 270 is formed by recording holograms, according to interference fringes in the holographic recording layer 260. Before recording the holographic information, the information layer 270 only virtually exists and is not physically different from other areas of the holographic recording layer 260.

The holographic recording layer 260 is formed of a photoreactive material. For example, the holographic recording layer 260 may be formed of a photopolymer or a thermoplastic material. A refractive index of the photoreactive material changes when light is absorbed, generally in proportion to light intensity. The photoreactive material may have a predetermined threshold value, and may have a nonlinear characteristic, wherein the photoreactive material reacts only with light equal to, or above, the predetermined threshold value. When the material of the holographic recording layer 260 has a nonlinear characteristic, a plurality of information layers 270 may be formed in the depth direction of the holographic recording layer 260. That is, the light intensity of an interference fringe decreases, as the interference fringe moves away from a focal point, and thus, the refractive index does not change. Accordingly, an information layer is formed according to a change of the refractive index, at a selected depth. Consequently, a light intensity equal to, or above, a threshold value is realized in the predetermined depth, via appropriate control, and a plurality of information layers are formed by controlling the predetermined depth, and recording density is increased accordingly.

A layer identifying area 280, which contains information to identify the information layers 270, may be formed on one side, for example, the inner circumference or outer circumference of the holographic recording layer 260. The layer identifying area 280 may include a plurality of reflective layers 282 corresponding to the plurality of information layers 270 and a plurality of transparent spacer layers 281, which are disposed between the reflective layers (interfaces) 282.

The layer identifying area 280 identifies the location (depth position) of a corresponding one of the information layers 270, by using light reflected from the corresponding reflective layer 282. Layer number information of one of the information layers 270 may be recorded in the corresponding one of the reflective layers 282. By using the reflective layers 282, each of the information layers 270 may be identified, and the depth of the corresponding information layer 270 may be determined. Thus the layer number information may be determined by the number of reflective layers 282. Alternatively, the layer number information may be used as an actual layer number of the information layer 270. Besides the layer number information, intrinsic information of each information layer 270 may be recorded in the corresponding reflective layers 282. Also, information about the reflective holographic information storage medium 200 may be recorded in the reflective layers 282. Such information may be recorded in the reflective layers 282 in a fit, wobble, or mark, as used in a CD or DVD.

The reflective layer 282 may be used to determine a location (depth) of the information layer 270 to be formed, in the thickness direction of the holographic recording layer 260. By using the layer identifying area 280, the information layer 270 may be formed at a location (depth) of the holographic recording layer 260 corresponding to the reflective layer 282 having the desired layer number information.

A method of recording holographic information using the apparatus described with reference to FIGS. 1 and 2 will now be described. Referring to FIG. 1, the optical pickup 500 radiates light on the layer identifying area 280 of the reflective holographic information storage medium 200, to read layer identifying information recorded in the layer identifying area 280, and thereby determine a focal point of the object lens 534. Here, the light radiated on the layer identifying area 280 may be the light L1 emitted from the first light source 510. For example, the layer identifying information recorded in the layer identifying area may be read using the reference beam L12, which is directly focused on the layer identifying area 280, after being transmitted through the cover layer 290, or by the undivided light produced during the reproduction mode or fixing mode.

Then, the focal point F of the object lens 534 is moved to one of the reflective layers 282 of the layer identifying area 280 corresponding to the location of the information layer 270, on which information is to be recorded, or from which information is to be read. The focal point F is changed by using the first focus control unit 520. Since the undivided light is sufficient to identify the layer location of the information layer 270, the polarization conversion unit 528 may transmit the light L1, without polarizing the light L1. In other words, the optical pickup 500 may operate as if it were in the reproduction mode, while identifying the layer location of the information layer 270.

Then, while maintaining the depth of the focal point F of the object lens 534, the optical pickup 500 is moved to an information recording area of the holographic recording layer 260, so as to form the information layer 270, or to read information recorded in the information layer 270.

During the recording mode, the signal beam L11 and the reference beam L12 are transmitted to the reflective holographic information storage medium 200, via the same object lens 534 (along the same path). The signal beam L11 is focused on the information layer 270, after being reflected from the reflective layer 240, and the reference beam L12 is directly focused on the information layer 270, after being transmitted through the cover layer 290 (without being reflected). As such, when the signal beam L11 and the reference beam L12 are focused on the information layer 270, an interference fringe is formed on the information layer 270. The shape of the interference fringe changes, according to a modulated state of the light L1. Thus, information is recorded according to the shape of the interference fringe. The interference fringe may form one information layer 270, by being recorded along a track on the same plane. Also, a plurality of information layers 270 may be formed by forming interference fringes and changing the depth of a focal point in the holographic recording layer 260. The reflective holographic information storage medium 200 may use a micro holography method, whereby information of a single bit is stored in an interference fringe, for each focal point, but the reflective holographic information storage medium 200 may use any other method. For example, a volume holography method may be used, whereby a 3-dimensional interference fringe is formed, by overlapping the signal beam L11 and the reference beam L12, at the focal point F, thereby simultaneously recording a plurality of pieces of information.

Here, instead of using the light L1, a servo beam emitted from the second light source 550 may be used to identify the location of the information layer 270. Alternatively, a separate light source and optical system may be further included, in order to identify the location of the information layer 270, by using light emitted from the separate light source.

According to the method, an information layer 270 is formed by recording a hologram along a track, on the same plane of a desired layer location of the holographic recording layer 260. The information layer 270 is fixed by radiating light on the information layer 270, according to the control of the controller 600.

If reproduction is performed without fixing the information layer 270, non-reacted monomers that do not change into polymers, in the reflective holographic information storage medium 200, react with reproduction light, and thus, the shape of an interference fringe is changed, thereby generating noise. Alternatively, when the information layer 270 is fixed, the non-reacted monomers in the information layer 270 are fixed, so as not to react with the reproduction light. Accordingly, the interference fringe is maintained, and thus, noise is reduced or removed. The controller 600 may control the first light source 510, to modulate the light L1 during the recording mode, and not to modulate the light L1, during the reproduction or fixing mode.

Figure 3:
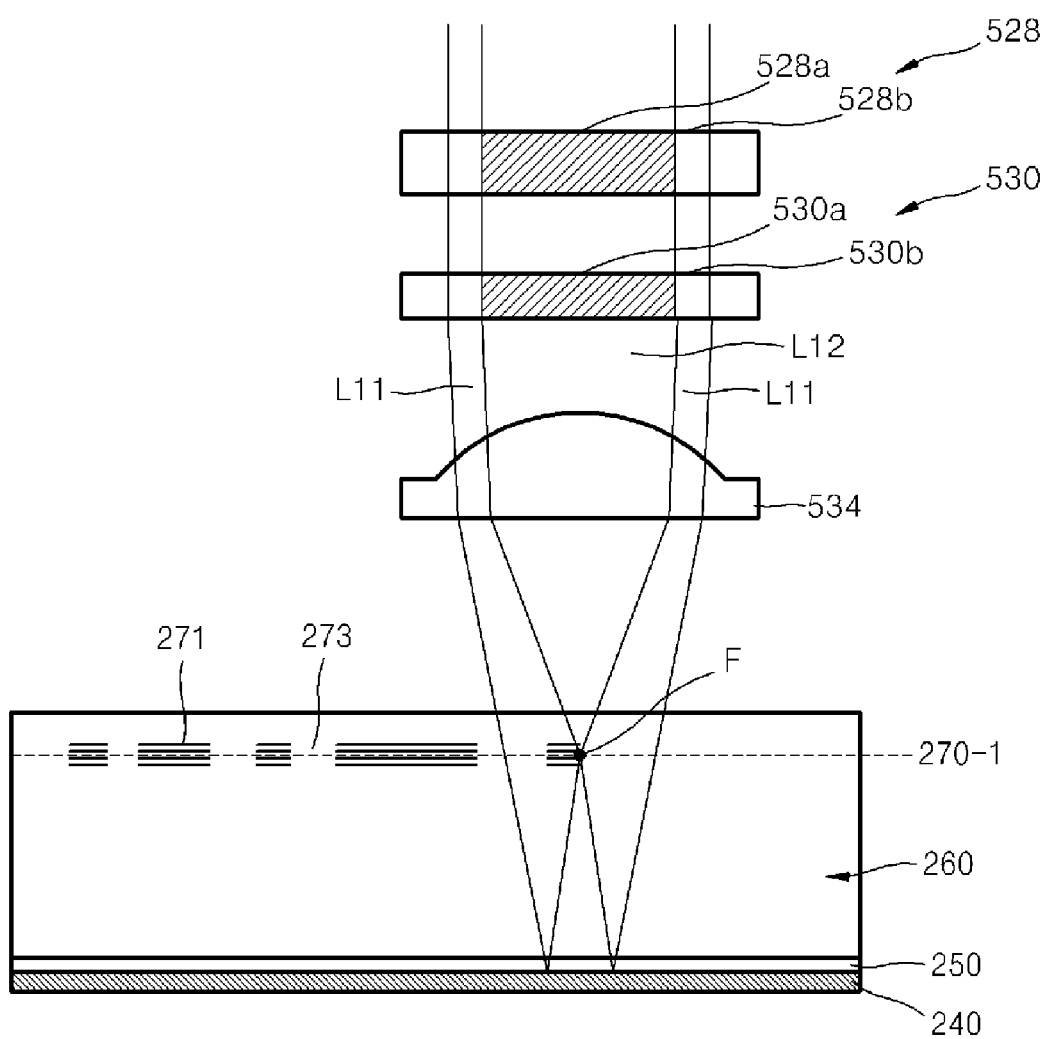
FIGS. 3 through 5 are diagrams for describing a method of recording holographic information, according to an exemplary embodiment of the present teachings.
Figure 4:
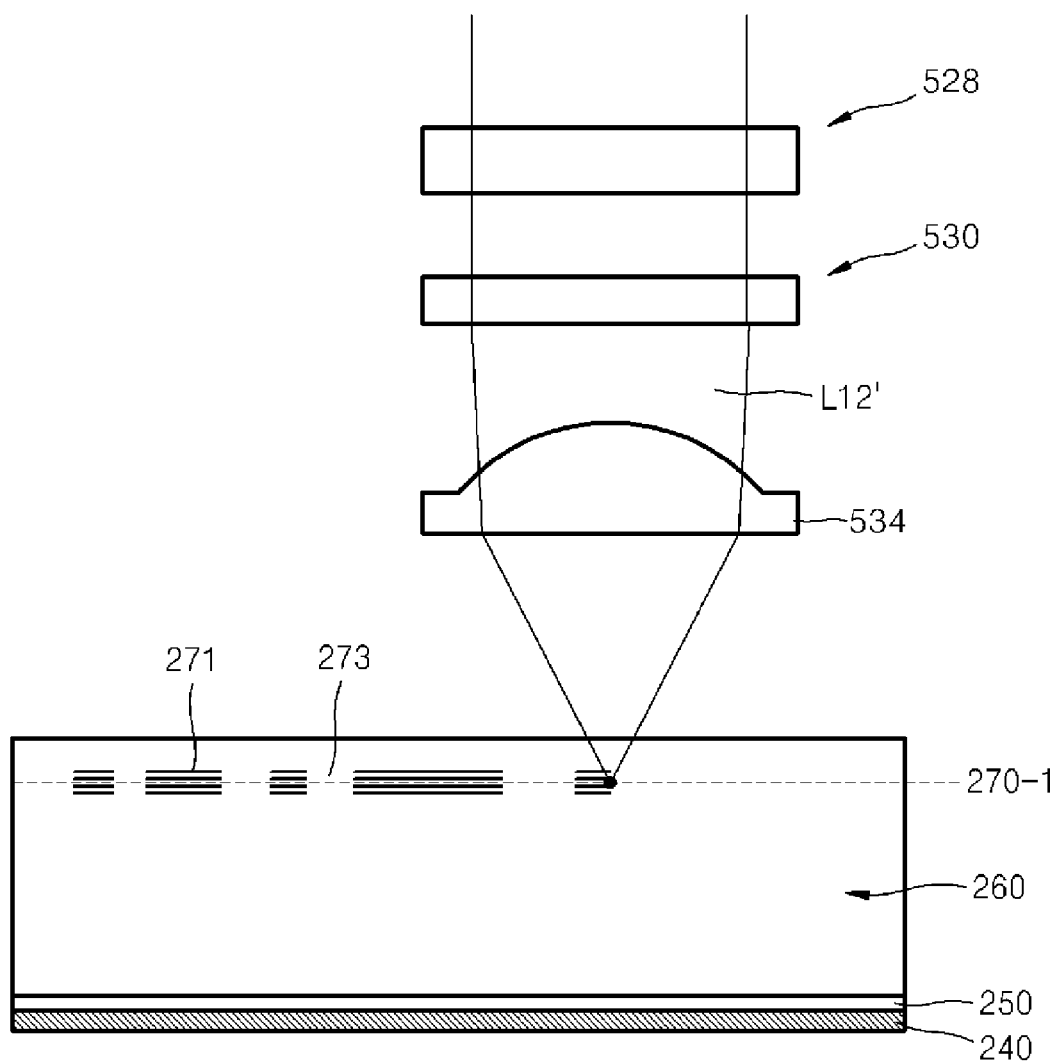

When the plurality of information layers 270 on which a hologram is formed are to be formed in a depth direction of the holographic recording layer 260, the signal beam L11 and the reference beam L12 are focused on the focal point F, and a hologram, obtained via interference of the signal beam L11 and the reference beam L12, is recorded, so as to form an information layer 270-1, as illustrated in FIG. 3. Then, as illustrated in FIG. 4, a reference beam L12' is radiated on the information layer 270-1, to fix the information layer 270-1. During the fixing process, the light L1 may be transmitted through the polarization conversion unit 528, without polarization. Here, the light L1 may be used as the reference beam L12'. Considering this, different reference numerals are used for a reference beam (L12') during the fixing process, and a reference beam (L12) during a recording process.

Figure 5:
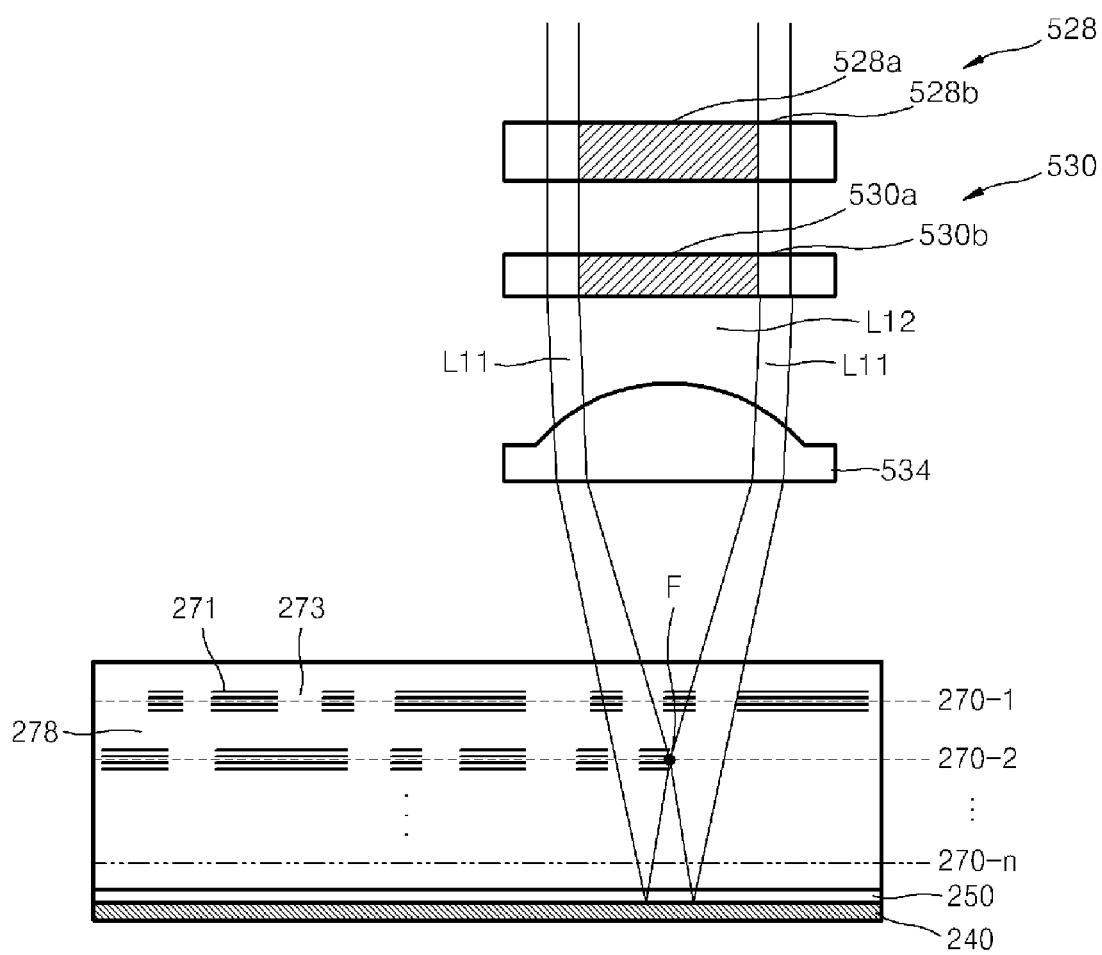

After fixing the information layer 270-1, the object lens 534 is used to move the focal point F to a location for forming a next information layer 270-2, as illustrated in FIG. 5. Then the next information layer 270-2 is formed. The next information layer 270-2 is fixed by the reference beam L12'.

In the case of the reflective holographic information storage medium, when light that is not reflected from the reflective layer 240 is used for the fixing process, such as the reference beam L12', the sensitivity and M# loss of a non-reacted area, i.e., an area that is not recorded yet, of the holographic recording layer 260 are reduced, by the reference beam L12'. In this regard, when light is radiated on the holographic recording layer 260 a number of times, the sensitivity deterioration and M# loss occur. Accordingly, in order to reduce the sensitivity deterioration and M# loss of the non-reactive area, light that does not pass through the non-reacted area may be used during the fixing process. Considering the sensitivity deterioration and M# loss of the non-reacted area, the plurality of information layers 270 may be formed, starting from a location near to a plane of incidence that is on an opposite side of the reflective layer 240. However, the plurality of information layers 270 may be formed starting from a location near to the reflective layer 240.

As described above, the plurality of layers 270, i.e. the first information layer 270-1 through n-th information layer 270-n (n is an integer of at least 2), may be formed at different depths in the holographic recording layer 260 and fixed, by forming the first information layer 270-1, fixing the first information layer 270-1 by radiating light, and then forming the second information layer 270-2 by changing the depth of a focal point of the object lens 534.

Each information layer 270 includes a recording area 271, on which a hologram is recorded, and a spacer area 273. During the fixing process, fixation light is irradiated on both the recording area 271 and the spacer area 273. By radiating the fixation light on both the recording area 271 and the spacer area 273, the entire area of the information layer 270 is fixed, while reducing a refractive index difference between the recording area 271 and the spacer area 273. Accordingly, while forming another information layer 270, aberrations, such as spherical aberrations, may be reduced, thereby ensuring recording stability.

Since intervals exist between each information layer 270, a spacer layer 278 is formed between each of the information layers 270, as illustrated in FIG. 5. The spacer layer 278 denotes an area between the information layers 270. Accordingly, in order to reduce the generation of noise caused by the diffusion of monomers in the spacer layer 278, the spacer layer 278 is also fixed by the fixation light.

The spacer layer 278 may be fixed as follows. After forming and fixing the first information layer 270-1, and before forming the second information layer 270-2, the spacer layer 278 between the first and second information layers 270-1 and 270-2 may be fixed. For example, the plurality of information layers 270 may be formed by forming the first information layer 270-1, fixing the first information layer 270-1, fixing the adjacent spacer layer 278, forming the second information layer 270-2, fixing the second information layer 270-2, and so on.

Alternatively, forming and fixing of the information layers 270 may be repeatedly performed, and then the spacer layers 278 between the information layers 270 may be fixed. In other words, the plurality of information layers 270 may be sequentially formed and fixed, and then the spacer layers 278 may be fixed by radiating light on the spacer layers 278.

When the reflective holographic information storage medium 200 including the reflective layer 240 is used, the signal beam L11 and the reference beam L12 are incident on the same plane of the reflective holographic information storage medium 200, i.e., are radiated onto the same side of the storage medium 200. Here, one of the signal beam L11 and the reference beam L12, for example, the reference beam L12, is directly focused on a hologram forming location of the holographic recording layer 260, and another one of the signal light L11 and the reference light 12, for example, the signal beam L11 is focused on the hologram forming location, after being reflected from the reflective layer 240. By radiating the signal beam L11 and the reference beam L12, the information layers 270 are sequentially formed, starting from a location that is farthest from, or nearest to, the reflective layer 240. FIGS. 3 through 5 illustrate an example of forming the information layers 270 starting from a location farthest from the reflective layer 240.

During the fixing process, light may be transmitted through the selective polarization conversion area 528b of the polarization conversion unit 528, without being polarized. Accordingly, p-polarized light emitted from the first light source 510 may be directly focused on the focal point F, without being reflected from the reflective layer 240, along the same optical path as the reference beam L12, in the recording mode. Accordingly, the information layer 270 or the spacer layer 278 may be fixed by using light from a single source, for example, light following the optical path of the reference beam L12 that is emitted from the first light source 510 and radiated on the hologram forming location, without being reflected from the reflective layer 240.

Figure 6:
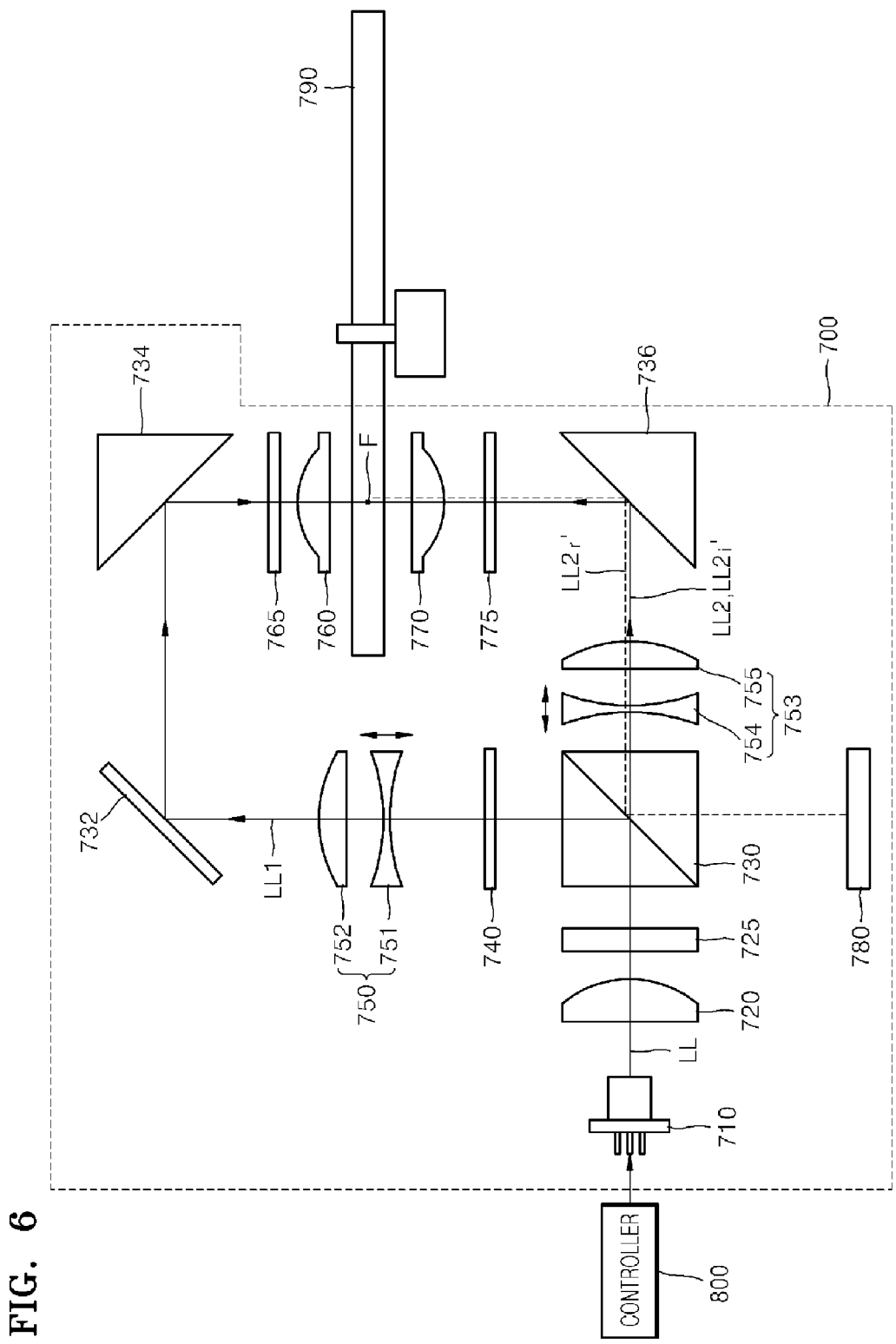
FIG. 6 is a diagram schematically illustrating an apparatus for recording/reproducing holographic information, according to another exemplary embodiment of the present teachings.

FIG. 6 is a diagram schematically illustrating an apparatus for recording/reproducing holographic information, according to another exemplary embodiment of the present teachings. Referring to FIG. 6, the apparatus records information on a transmissive holographic information storage medium 790, to which light is radiated on both sides thereof, and reproduces the recorded information. The apparatus includes an optical pickup 700 that radiates light on both sides of the transmissive holographic information storage medium 790 and receives the radiated light, a controller 800 that controls the optical pickup 700, and a circuit unit (not shown).

The optical pickup 700 forms the information layer by recording a hologram, by radiating light on a plane of a holographic recording layer of the transmissive holographic information storage medium 790. The optical pickup 700 fixes the information layer, by radiating light.

The optical pickup 700 may include a light source 710, which emits light LL, an optical path separating device 730, which separates the light LL into a signal beam LL1 and a reference beam LL2, a first object lens 760, which concentrates the signal beam LL1 on the transmissive holographic information storage medium 790, a second object lens 770, which concentrates the reference beam LL2 on the transmissive holographic information storage medium 790, and an optical detector 780, which detects a reproduction beam LL2r' that is reflected from the transmissive holographic information storage medium 790. The optical pickup 700 may further include first and second focus control units 750 and 753, which vary the depth of a focal point. Moreover, the optical pickup 700 may further include a collimating lens 720, which converts the light emitted from the light source 710 into parallel light, and first through third reflective members 732, 734, and 736, which suitably confine an optical path. The optical pickup 700 may further include a servo optical system (not shown). A structure described with reference to FIG. 1 may be used as the servo optical system.

The light source 710 and the optical path separating device 730 form a light source unit that emits light for recording/reproducing. A semiconductor laser diode emitting green light may be used as the light source 710.

The collimating lens 720 collimates the light LL emitted from the light source 710 and converts the light LL to parallel light. In FIG. 6, the collimating lens 720 is disposed between the light source 710 and a polarization conversion unit 725. Alternatively, the collimating lens 720 may be disposed between the polarization conversion unit 725 and the optical path separating device 730, or anywhere on an optical path of the light LL.

A semiconductor laser diode used as the light source 710 generally emits a laser beam having a single polarization component. The polarization conversion unit 725 may be disposed between the light source 710 and the optical path separating device 730.

A wave plate, such as a half wave plate, or a quarter wave plate, may be used as the polarization conversion unit 725. For example, when an active half wave plate is used as the polarization conversion unit 725, light having a predetermined rotational polarization is rotated a polarization direction, by being transmitted through the active half wave plate, and thus, may be converted to light having two rotational polarization components, i.e., an s-polarization component and a p-polarization component, which cross each other at right angles. When an active quarter wave plate is used as the polarization conversion unit 725, light having a predetermined rotational polarization is converted to circular polarized light. Such circular polarized light may be divided into two rotational polarization components that cross each other at right angles. As such, the s-polarization component and the p-polarization component of the light transmitted through the polarization conversion unit 725 may be respectively used as the signal beam LL1 and the reference beam LL2.

The polarization conversion unit 725 may be an active type, which performs a polarization conversion function during a recording process, and does not perform the polarization conversion function during a reproducing process. In other words, the polarization conversion unit 725 may be an active half wave plate or an active quarter wave plate. As such, when an active device is used as the polarization conversion unit 725, most of the light emitted from the light source 710 is used as reproduction light (reproduction beam).

When the apparatus uses a micro holography method, wherein an interference fringe, formed when the signal beam LL1 and the reference beam LL2 interfere with each other, includes a single bit of information at each focal point, because light emitted from the light source 710 is modulated by one bit. Accordingly, the signal beam LL1 and the reference beam LL2 both include recording information, and may be referred to interchangeably, as they are not substantially different during the recording process. For convenience of description, light that has the same optical path as a reproduction beam LL2$i'$ radiated on the transmissive holographic information storage medium 790, is referred to the reference beam LL2.

The optical path separating device 730 separates two polarization components that cross each other, so that light having each polarization component is radiated on the transmissive holographic information storage medium 790, along different optical paths. A polarization beam splitter, for which the transmission and reflection of light differs according to a polarization direction thereof, may be used as the optical path separating device 730. For example, p-polarized light radiated to the optical path separating device 730 may be transmitted there through, and s-polarized light radiated to the optical path separating device 730 may be reflected there from. During the reproduction process, the optical path separating device 730 may separate the reproduction beam LL2$i'$, which is radiated to the transmissive holographic information storage medium 790, and the reproduction beam LL2$r'$, which is reflected from the transmissive holographic information storage medium 790.

The optical detector 780 is disposed on one side of the optical path separating device 730, and detects the reproduction beam LL2$r'$ that is reflected from the transmissive holographic information storage medium 790 and transmitted through the optical path separating device 730. The signal beam LL1 and the reference beam LL2, which are separated by the optical path separating device 730, are radiated to the transmissive holographic information storage medium 790, via a concentration optical system.

The transmissive holographic information storage medium 790 is a transmissive medium. The signal beam LL1 and the reference beam LL2 are radiated through opposing sides of the transmissive holographic information storage medium 790. The concentration optical system may be divided into a first concentration optical system to concentrate the signal beam LL1, and a second concentration optical system to concentrate the reference beam LL2. The first concentration optical system may include a shutter 740, the first focus control unit 750, the first and second reflective members 732 and 734, a first quarter wave plate 765, and the first object lens 760. The second concentration optical system may include the second focus control unit 753, the third reflective member 736, a second quarter wave plate 775, and the second object lens 770.

The first through third reflective members 732, 734, and 736 are optical members that bend an optical path, so that optical devices are suitably disposed. The first through third reflective members 732, 734, and 736 each may be a mirror or a total reflection prism.

The shutter 740 allows light to be transmitted there through or blocks light. During the recording process, the signal beam LL1 is transmitted through the shutter 740, and during the fixing process, the signal beam LL1 is blocked by the shutter 740, so that only the reference beam LL2 is used. During the reproduction process, the reproduction beam LL2$i'$ is transmitted through the transmissive holographic information storage medium 790 and proceeds along an optical path that is opposite to that of the signal beam LL1 and thus, is blocked from being radiated to the optical path separating device 730. As will be described later, when both the signal beam LL1 and the reference beam LL2 are used for the fixing process, the shutter 740 may allow the signal beam LL1 and the reference beam LL2 to be transmitted there through, during the fixing process.

The beam LL emitted from the light source 710 is not completely rotationally polarized, and may include another rotational polarization component. Accordingly, during the reproduction process, not only the reproduction beam LL2$i'$ and light reflected from the optical path separating device 730 may exist. As described above, during the reproduction process, some light is blocked by the shutter 740 and is not transmitted to the transmissive holographic information storage medium 790.

The first and second focus control units 750 and 753 change focal points (which may be disposed at the same point) of the signal beam LL1 and the reference beam LL2 on the transmissive holographic information storage medium 790. For example, the first focus control unit 750 includes first and second relay lenses 751 and 752. The first relay lens 751 moves along an optical axis, so as to change the focal point of the signal beam LL1. The second focus control unit 753 includes third and fourth relay lenses 754 and 755. The third relay lens 754 moves along an optical axis, so as to change the focal point of the reference beam LL2. As such, by changing the focal points of the signal beam LL1 and the reference beam LL2, the interference fringes, i.e. the holograms, are recorded in multiple layers in the transmissive holographic information storage medium 790.

Figure 7:
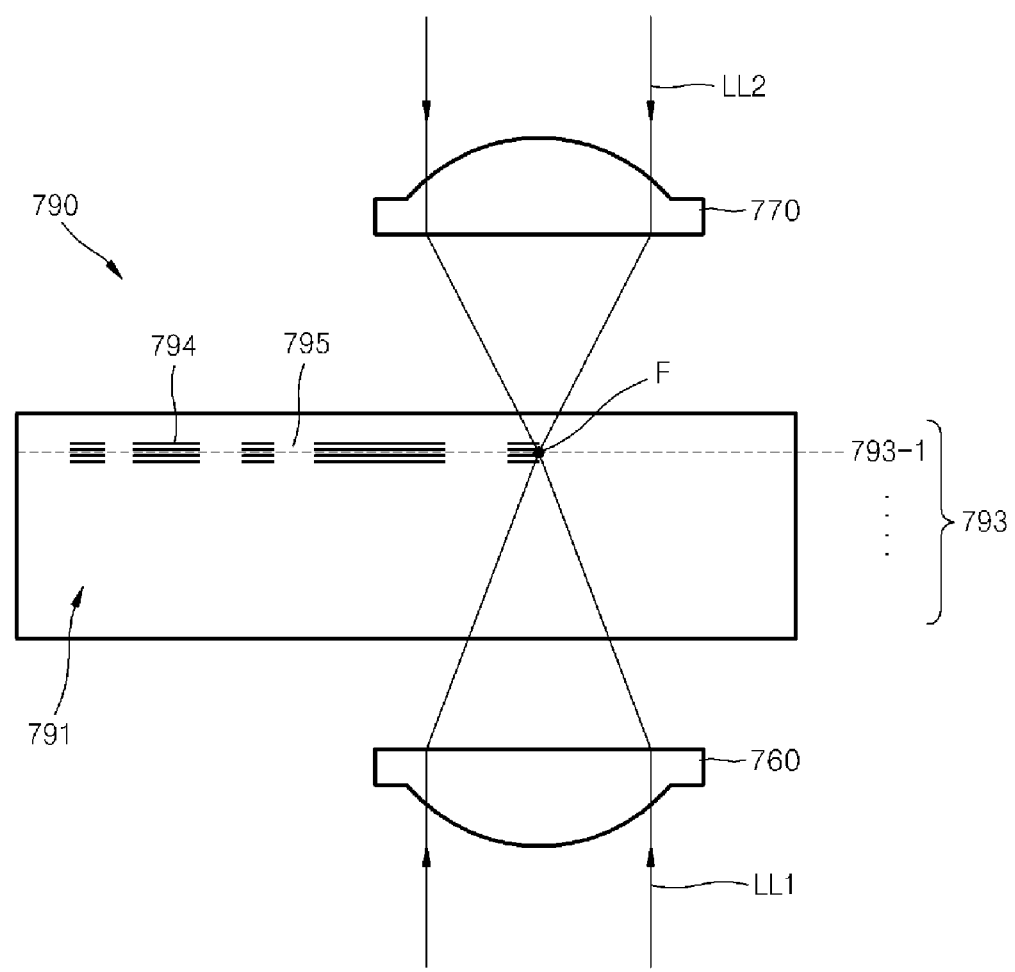
FIGS. 7 through 9 are diagrams for describing a method of recording holographic information, according to another exemplary embodiment of the present teachings.

First and second polarization plates 765 and 775 convert light transmitted to the transmissive holographic information storage medium 790, from rotational polarized light to circular polarized light. The transmissive holographic information storage medium 790 includes a holographic recording layer 791, as illustrated in FIG. 7, on a substrate (not shown), and may include other elements. In other words, the transmissive holographic information storage medium 790 has a structure similar to the reflective holographic information storage medium 200, in which a servo layer, a buffer layer, a holographic recording layer, and a cover layer are sequentially stacked on a substrate, but includes a different reflective layer and a spacer layer.

A layer identifying area, which contains information to identify information layers formed on the holographic recording layer 791, may be formed on one side, such as an inner circumference or outer circumference, of the holographic recording layer 791. The layer identifying area may include a plurality of reflective layers respectively corresponding to the information layers, and transparent spacer layers disposed between the reflective layers. Materials and physical/optical characteristics of each layer and area of the transmissive holographic information storage medium 790 are similar to those of the reflective holographic information storage medium 200, and thus, details thereof will not be repeated.

Figure 8:
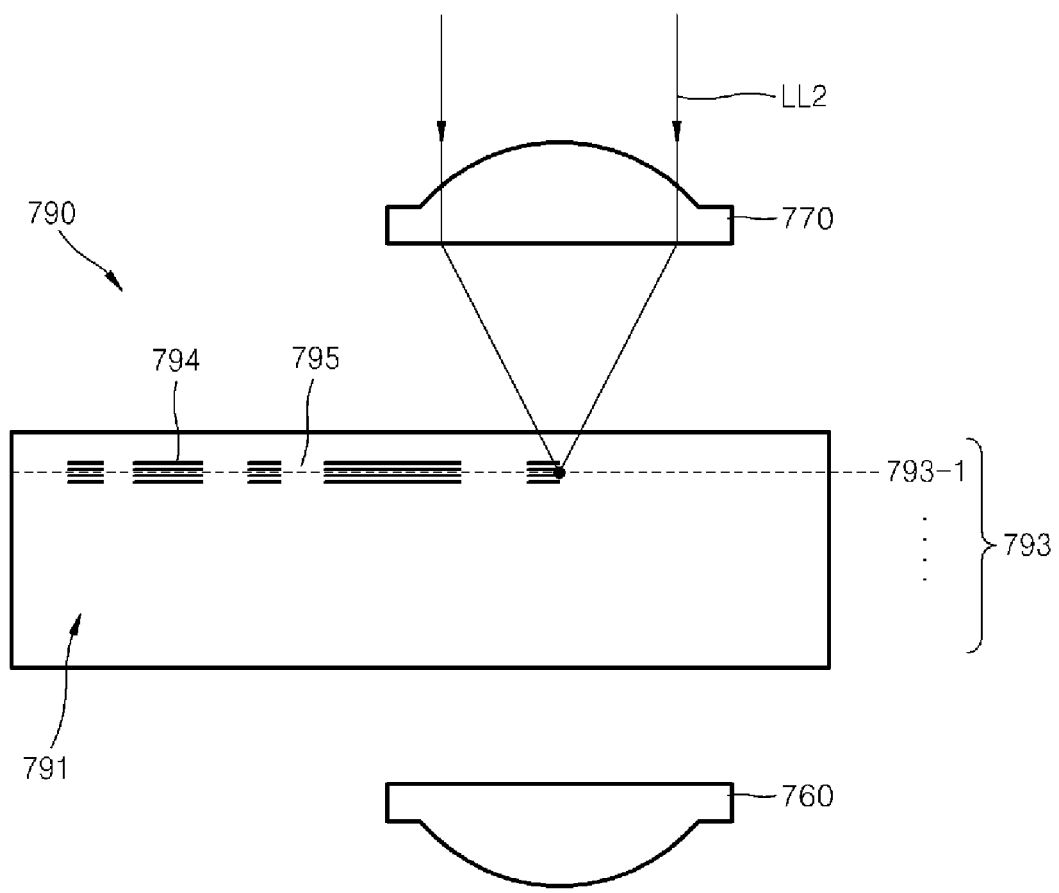
Figure 9:
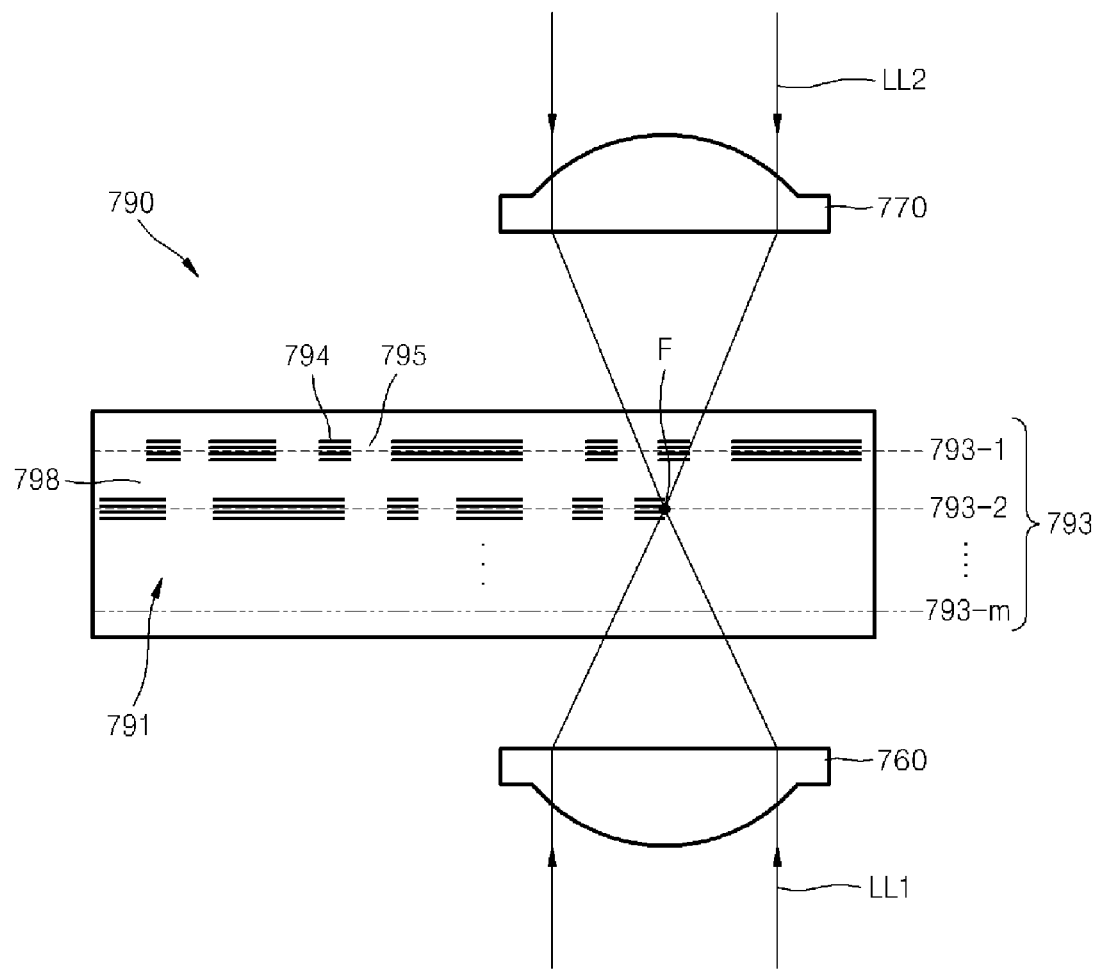

Referring to FIGS. 7 through 9, the signal beam LL1 and the reference beam LL2, which are radiated to each side of the transmissive holographic information storage medium 790, interfere with each other at the holographic recording layer 791, during the recording process. Through the recording process, information layers 793 (793-1 through 793-m, wherein m is an integer of at least 2) are formed by recording a hologram in the holographic recording layer 791. Before recording information, the information layers 793 only virtually exist and are not physically different from other areas of the holographic recording layer 791.

The holographic recording layer 791 is formed of a photoreactive material on which information is recorded in a hologram, according to an interference fringe. For example, the holographic recording layer 791 may be formed of a photo polymer or a thermal plastic material. A refractive index of the photoreactive material changes when light is absorbed thereby, generally in proportion to light intensity. The photoreactive material may have a predetermined threshold value, and may have a nonlinear characteristic, wherein the photoreactive material reacts only to light equal to or above the predetermined threshold value. When the material of the holographic recording layer 791 has a nonlinear characteristic, a plurality of information layers 793 may be formed in a depth direction of the holographic recording layer 260. That is, the light intensity of an interference fringe decreases, as the interference fringe moves away from a focal point, and thus, the refractive index does not change. Accordingly, an information layer is formed, according to change of the refractive index in the vicinity of an area, at a selected depth. Consequently, light intensity equal to or above a threshold value is realized in the predetermined depth, via appropriate control. A plurality of information layers are formed by controlling the predetermined depth, and the recording density is increased accordingly.

A method of recording holographic information using the apparatus described with reference to FIG. 6 will now be described. Referring to FIG. 6, the apparatus first locates the optical pickup 700, so as to radiate light on the layer identifying area of the transmissive holographic information storage medium 790, so as to read layer identifying information stored in the layer identifying area, and thereby checking focal points of the first and second object lenses 760 and 770. The light radiated on the layer identifying area may be the signal beam LL1 and the reference beam LL2. The signal beam LL1 and the reference beam LL2 may be unmodulated light, instead of the modulated light used during the recording process.

Then, focal points F of the first and second object lenses 760 and 770 are adjusted, with respect to a reflective layer of the layer identifying area, and corresponding to a location of the information layer 793 on which information is to be recorded, or from which information is to be read. The changing of the focal points F is performed using the first and second focus control units 750 and 753.

While maintaining the focal points F (focal point depth), the optical pickup 700 is moved to an information recording area of the holographic recording layer 791, so as to form the information layer 793 by recording information on a corresponding location, or to read information from the information layer 793.

During the recording process, the signal beam LL1 and the reference beam LL2 are focused on the focal point F in the information layer 793, by the first and second object lenses 760 and 770. As such, when the signal beam LL1 and the reference beam LL2 are focused on the information layer 793, an interference fringe is formed in the information layer 793. Since the shape of the interference fringe changes, according to a modulated state of the beam LL, information may be recorded in the interference fringe. The interference fringe is recorded on the same plane, so as to form one information layer 793 in the holographic recording layer 791. By changing the depth of the focal point F in the holographic recording layer 791, the information layers 793 are formed.

The transmissive holographic information storage medium 790 may be recorded on using a micro holography method, or may be recorded on using any other suitable method. For example, a volume holography method may be used.

An information layer 793 is formed by recording a hologram on the plane of a desired layer location in the holographic recording layer 791. The information layer 793 is fixed by radiating light on the information layer 793, according to the control of the controller 800. The controller 800 may control the light source 710 to modulate the light LL, during the recording process, and not to modulate the light LL, during the reproduction or fixing process.

When the information layers 793 are recorded, the focal points of the signal beam LL1 and the reference beam LL2 are set to the focal point F, where a first information layer 793-1 is to be formed, as illustrated in FIG. 7, so as to form the first information layer 793-1. Then, by operating the shutter 740 to block the signal beam LL1, only the reference beam LL2 is irradiated on the first information layer 793-1, to fix the first information layer 793-1, as illustrated in FIG. 8.

Next, by changing focal points of the first and second object lenses 760 and 770, the focal point F is located at a depth at which a second information layer 793-2 is to be formed, as illustrated in FIG. 9. Then the second information layer 793-2 is formed. The second information layer 793-2 is fixed by only radiating, for example, the reference beam LL2.

When only one beam, i.e., the reference beam LL2, is used in the fixing process, sensitivity deterioration and M# loss of a non-reacted area, i.e., an area on which information is not recorded yet, of the holographic recording layer 791, which are generated by light radiated during the fixing process, are minimized, by using light that is not radiated through the non-reacted area, such as the reference beam LL2. When light is radiated on the holographic recording layer 791 a number of times, sensitivity deterioration and M# loss may occur. Accordingly, in order to reduce the sensitivity deterioration and M# loss of the non-reacted area, a light that is not transmitted through the non-reacted area may be used during the fixing process. Considering the sensitivity deterioration and M# loss of the non-reactive area, the information layers 793 may be formed starting from a location near to a plane of incidence of the reference beam LL2.

As described above, the information layers 793-1 through 793-m, are formed at different depths in the holographic recording layer 791 and fixed, by forming and fixing the first information layer 793-1, forming and fixing the second information layer 793-2, and so on, while changing focal points of the first and second object lenses 760 and 770.

Each information layer 793 includes a recording area 794, on which a hologram is recorded, and a spacer area 795. During the fixing process, fixation light is radiated on both the recording area 794 and the spacer area 795. By radiating the fixation light on both the recording area 794 and the spacer area 795, the entire information layer 793 is fixed, while reducing a refractive index difference between the recording area 794 and the spacer area 795. Accordingly, while forming another information layer 793, aberrations, such as spherical aberrations may be reduced. Thus, recording stability is obtained.

There is an interval between the information layers 793. Thus a spacer layer 798 exists between each of the information layers 793, as illustrated in FIG. 9. Accordingly, the spacer layer 798 is also fixed by the fixation light, so as to suppress the generation of noise, due to monomer diffusion in the spacer layer 798. The spacer layer 798 may be fixed as follows.

For example, after forming and fixing the first information layer 793-1, and before forming the second information layer 793-2, the spacer layer 798 between the first and second information layers 793-1 and 793-2 may be fixed. In other words, the plurality of information layers 793 may be formed by forming the first information layer 793-1, fixing the first information layer 793-1 and the adjacent spacer layer 798, forming the second information layer 793-2, fixing the second information layer 793-2 and adjacent spacer layer 798, and so on.

Alternatively, the information layers 793 may be formed and fixed, and then the spacer layers 798 between the information layers 793 may be fixed. In other words, the first information layer 793-1 may be formed and fixed, the second information layer 793-2 may be formed and fixed, and so on, and then the spacer layers 798 may be fixed, by radiating light on the space layer 798.

When the first information layer 793-1 is formed first, and the m-th information layer 793-m is formed last, light transmitted via a plane of incidence that is closer to the first information layer 793-1 than the m-th information layer 793-m, for example, the reference beam LL2, may be used to fix the information layers 793.

In FIG. 8, only the reference beam LL2 is shown to be used in the fixing process, however, the signal beam LL1 may also be used in the fixing process. At least one of the first and second focus control units 750 and 753 is operated to change a focal point of at least one of the signal beam LL1 and the reference beam LL2, so that the signal beam LL1 and the reference beam LL2 do not form an interference fringe on a fixing location. As such, when the signal beam LL1 and the reference beam LL2 are used in the fixing process, non-reacted monomers are reduced or removed during the recording process, while not affecting the recorded hologram mark. A difference of refractive indexes of the recording area 794 and the spacer area 795 is reduced, and a difference of refractive indexes of the information layer 793 and the spacer layer 798 is reduced.

According to the method and apparatus of the present teachings, the integrity and stability of storage data is improved, via a fixing process, and the generation of noise is suppressed during a reproduction process. Also, a difference of refractive indexes between a recording area and a spacer area can be reduced. Accordingly, generation of spherical aberrations, while light is being transmitted to a next information layer is reduced. Thus, data generation stability during a recording process is increased.

Although a few exemplary embodiments of the present teachings have been shown and described, it would be appreciated by those skilled in the art that changes may be made in these exemplary embodiments, without departing from the principles and spirit of the present teachings, the scope of which is defined in the claims and their equivalents.

What is claimed is:

1. A method of recording holographic information, the method comprising: forming an information layer by recording a hologram in a holographic recording layer of a holographic information storage medium; fixing the information layer, by radiating light on the information layer; and repeating the forming and fixing, so as to form a plurality of the information layers, at different depths in the holographic recording layer, wherein the fixing of each of the information layers comprises fixing an unrecorded area of the holographic recording layer that is disposed between the information layer and an area of the holographic recording layer where a subsequent one of the information layers is to be formed.

2. The method of claim 1, wherein the forming of each of the information layers comprises reflecting light from a reflective layer of the holographic storage medium.

3. The method of claim 1, wherein:
each of the information layers comprises a recording area on which the hologram is recorded, and a spacer area where a hologram is not recorded; and
the fixing of each of the information layers comprises fixing both the recording area and the spacer area.

4. The method of claim 1, wherein the recording and the fixing of each of the information layers is performed using light emitted from a single light source.

5. The method of claim 4, wherein:
the holographic information storage medium comprises a reflective layer;
the light emitted from the light source is divided into a signal beam and a reference beam, which are radiated to the holographic information storage medium via the same optical path, with one of the signal beam and the reference beam being focused directly on a focal point in the holographic recording layer, and the other one of the signal beam and the reference beam being reflected from the reflective layer, before being focused on the focal point;
the information layers are sequentially formed starting at a location in the holographic recording layer that is farthest from, or nearest to, the reflective layer, in a depth direction of the holographic recording layer; and
the fixing the information layers comprises directly focusing the light from the light source on each of the information forming layers, in an undivided state, without the light being reflected from the reflective layer.

6. The method of claim 4, wherein:
the light emitted from the light source is divided into a signal beam and a reference beam;
the forming of each of the information layers comprises,
radiating the signal beam onto the holographic recording layer, through a first surface of the holographic recording medium,
radiating the reference beam onto the holographic recording layer, through an opposing second surface of the holographic recording medium, via opposing planes of incidence of the holographic information storage medium, such that the signal beam and the reference beam interfere with one another and form an interference fringe in the holographic recording layer;
the fixing of each of the information layers comprises using one of the signal beam and the reference beam that does not pass through an un-reacted portion of the recording layer, before being focused on each of the information layers.

7. The method of claim 1, wherein:
the forming of each of the information layers comprises dividing light emitted from a light source into a signal beam and a reference beam, which interfere with one another to form each of the information layers; and
the fixing of each of the information layers comprises using the light emitted from the light source, in an undivided state, to fix each of the information layers, while suppressing an interference between the signal beam and the reference beam, by changing a focal point of at least one of the signal beam and the reference beam.

8. The method of claim 7, wherein:
the holographic information storage medium comprises a reflective layer;
the forming of each of the information layers comprises the signal beam and the reference beam being radiated to the holographic information storage medium via the same optical path, with one of the signal beam and the reference beam being directly focused directly on a focal point in the holographic recording layer, and the other one of the signal beam and the reference beam being focused on the focal point, after being reflected from the reflective layer, and the information layers are sequentially formed, starting at a location in the holographic recording layer that is farthest from, or nearest to, the reflective layer.

9. An apparatus to record and reproduce holographic information on a holographic information storage medium comprising a holographic recording layer, the apparatus comprising:

an optical pickup that radiates light on the holographic recording layer; and a controller to control the optical pickup, according to the method of claim 1.

10. The apparatus of claim 9, wherein the optical pickup comprises:

a light source to emit light;

a polarization conversion unit to convert the emitted light into a signal beam and a reference beam, wherein the controller controls the optical pickup to radiate the light emitted from the light source, in an unconverted state, to the information layers, to fix the information layers.

11. The apparatus of claim 10, wherein:

the holographic information storage medium comprises a reflective layer;

the controller controls the optical pickup to focus one of the signal beam and the reference beam, directly on a focal point in the holographic recording layer, and to focus the other one of the signal beam and the reference beam on the focal point, after being reflected by the reflective layer; and the controller controls the optical pickup to sequentially form the information layers, starting from a location of the holographic recording layer that is farthest from, or nearest to, the reflective layer.

12. The apparatus of claim 10, wherein the optical pickup comprises:

a first optical path to focus the reference beam through a first side of the holographic information storage medium; and a second optical path to focus the signal beam through an opposing second side of the holographic information storage medium, wherein the controller controls the optical pickup to fix the information layers, using one of the reference beam and the signal beam that does not pass through an un-reacted area of the holographic storage layer, before being focused on each of the information layers.

13. The apparatus of claim 10, wherein the controller controls the optical pickup to fix the information layers using both a signal beam and a reference beam used to record the hologram are used to fix the information layer, and the information layer is fixed while suppressing generation of interference between the signal beam and the reference beam by changing a focal point of at least one of the signal beam and the reference beam.

14. The apparatus of claim 13, wherein:

the holographic information storage medium comprises a reflective layer;

the controller controls the optical pickup to radiate the signal beam and the reference beam along the same optical path, with one of the signal beam and the reference beam being directly focused on a focal point in the holographic recording layer, and the other one of the signal beam and the reference beam being focused on the focal point, after being reflected from the reflective layer; and the controller controls the optical pickup to sequentially form the information layers starting from a location of the holographic recording layer that is farthest from, or nearest to, the reflective layer.

15. An apparatus for recording and reproducing holographic information, comprising:

an optical pickup that records a hologram in a holographic recording layer by radiating light on a holographic information storage medium comprising the holographic recording layer, and fixes the recorded hologram by radiating light on the hologram mark, wherein the holographic information is recorded by using the method of claim 1.

16. The apparatus of claim 15, wherein the information layer on which the hologram is recorded is fixed by radiating light emitted from a light source and used to record a hologram mark, wherein the beams are a single beam.

17. A method of recording holographic information, the method comprising: forming an information layer by recording a hologram in a holographic recording layer of a holographic information storage medium; fixing the information layer, by radiating light on the information layer; and repeating the forming and fixing, so as to form a plurality of the information layers, at different depths in the holographic recording layer, further comprising fixing areas of the holographic recording layer that are disposed between the information layers, after the information layers have all been formed and fixed.

18. An apparatus for recording and reproducing holographic information on a holographic information storage medium comprising a holographic recording layer, the apparatus comprising:

an optical pickup that records holograms as information layers on the holographic recording layer, by radiating light on the holographic recording layer, and fixes the recorded information layers by radiating light on the information layers; and a controller to controls the optical pickup, according to the method of claim 17.

19. The apparatus of claim 18, wherein the optical pickup comprises a single light source to record and fix information layers.

* * * * *